Aug. 8, 1961     J. W. LOTHROP ET AL     2,995,071
AUTOMATIC CAMERA SHUTTER MECHANISM
Filed Jan. 27, 1958
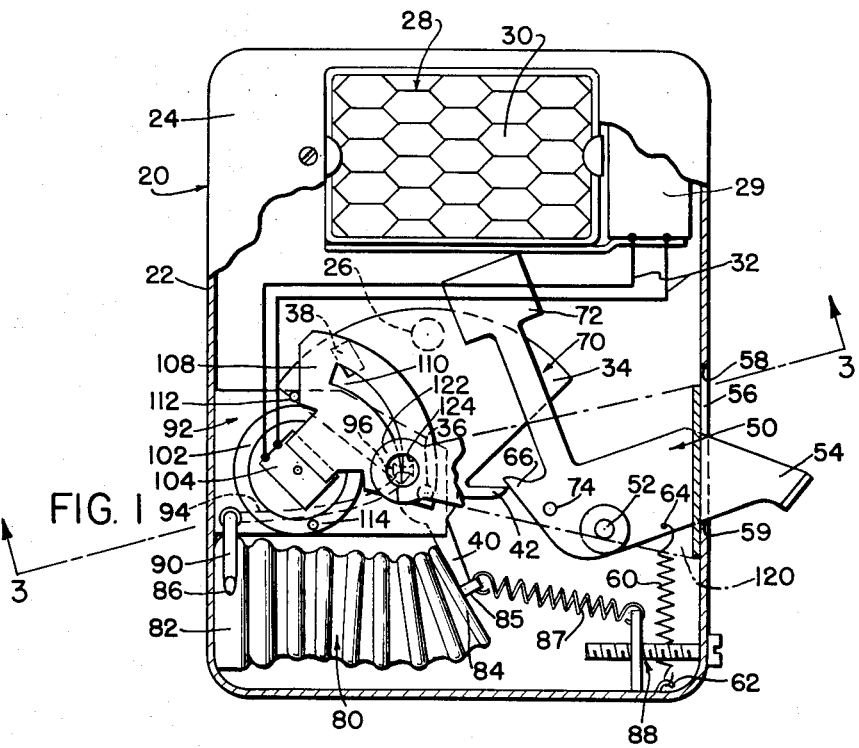
John W. Lothrop
Edward M. Purcell
and
Sidney B. Whittier
INVENTORS
BY
Brown and Mikulka
ATTORNEYS

United States Patent Office 2,995,071
Patented Aug. 8, 1961

2,995,071
AUTOMATIC CAMERA SHUTTER MECHANISM
John W. Lothrop, Westwood, Edward M. Purcell, Cambridge, and Sidney B. Whittier, Lexington, Mass., assignors to Polaroid Corporation, Cambridge, Mass., a corporation of Delaware
Filed Jan. 27, 1958, Ser. No. 711,331
13 Claims. (Cl. 95—10)

This invention relates to photographic apparatus and particularly to a novel shutter having an automatic photoelectric control of shutter speed.

Since the development of the photocell, particularly of the type known as the photovoltaic cell, many efforts have been made to utilize the electrical output of a photocell as a parameter for exposure control of photographic apparatus. Because until recently the power output of such cells has been considered too minute to provide the force necessary to move shutter elements, efforts had been directed primarily toward coupling photocell output to diaphragm aperture control or, where shutter speed control was desired, various schemes for amplifying the power output to operate shutter speed control means had been developed. However, the devices employing a mechanical method for such amplification have had serious difficulties due to the effect of mechanical friction upon their operation.

This invention, therefore, comprehends a photographic shutter means which includes a photosensitively controlled, pneumatic, variable shutter time delay means having a minimum of frictional elements.

A further object of this invention is to provide an automatic shutter having delay means for controlling the speed of said shutter in accordance with electrical signals from a photosensitive means, said delay means comprising an elastic enclosure having an aperture therein, and means controlling fluid flow through said aperture responsive to electrical signals.

Another object of this invention is to provide a shutter automatically responsive to intensities of light intended to be transmitted therethrough and comprising, in combination, a photosensitive means for producing electrical signals in accordance with said light intensities, an exposure aperture, a shutter element for covering and uncovering said exposure aperture, pneumatic means attached to said shutter element for moving said shutter element to cover and uncover said exposure aperture, said pneumatic means comprising an elastic collapsible and expansible enclosure having an opening therein, means for controlling movement of fluid through said opening in accordance with said electrical signals, the time rate of expansion of said enclosure being a function of the rate of fluid flow through said opening.

Other objects of the invention will in part be obvious and will in part appear hereinafter.

The invention accordingly comprises the apparatus possessing the construction, combination of elements and arrangement of parts which are exemplified in the following detailed disclosure and the scope of the application of which will be indicated in the claims.

For a fuller understanding of the nature and objects of the invention, reference should be had to the following detailed description taken in connection with the accompanying drawing wherein:

FIGURE 1 is a diagrammatic plan view, partly in fragmentary section, showing the associated elements of the invention;

FIG. 2 is a plan view of some of the elements of FIGURE 1 in a set position;

FIG. 3 is a cross section taken substantially along the line 3—3 of FIGURE 1;

FIG. 4 is an enlarged schematic plan view of the valve orifice shown in FIGURE 1.

There is shown in the drawing one form of the invention comprising means for defining an exposure aperture, movable shutter means for covering and uncovering said aperture, means for actuating the shutter means, and means for controlling the speed of movement of the shutter means in accordance with light intensities. These various means, which preferably may be hermetically sealed, cooperate in a novel manner with one another to establish an exposure, the exposure being understood to mean the total amount of light which this cooperation allows to pass through the aperture in terms of time, light intensity, and effective aperture area.

In the preferred form of the invention the entire mechanism may be hermetically sealed to minimize injurious effects of moisture and dust from the ambient atmosphere upon the operation of the components. This may be accomplished by sealing any junctures of housing portions, providing optical apertures with optically transparent airseals and providing seals for all electrical and mechanical extensions which may be necessarily made through the housing means. If the invention is to be used under circumstances where air-tightness might be undesirable because of difficulties created by differences in barometric pressure between the interior and exterior of the housing means, it is preferred that the housing remain sealed with, however, a vent provided leading into said interior with a filter inserted into the vent to exclude dust and other foreign matter.

Direction of rotation and position of the elements of the mechanism as hereinafter described are those which would be observed viewing the mechanism as in FIGURE 1, wherein is shown a housing means designated generally at 20, which housing means includes rear portion 22 and front portion 24 (only a fragment of the latter being shown). These portions provide means for defining an exposure aperture, for instance, rear portion 22 is shown as provided with aperture 26, front portion 24 having a similar aperture (not shown) disposed therein and being coaxial with aperture 26. A photosensitive means for generating electrical signals in accordance with light incident thereon, such as a photovoltaic cell shown at 28, which may be of any of the type well known in the art, is preferably mounted on the exterior of front housing portion 24 adjacent the aperture in said front housing portion, with the photosensitive surface of said cell being disposed approximately normal to the optical axis of aperture 26. As a means for temperature-compensating the electrical output of said cell and matching the linearity of cell output with a galvanometer response, there is provided a thermal resistance element such as is shown generally at 29. Cell 28 may be removable for mounting elsewhere and additionally may be provided with means for controlling the light incident upon said photosensitive surface, as for instance, a light-transmitting, lenticular surface cover as shown at 30, honey-comb baffles, louvres or the like. Means such as leads 32 are provided for electrically coupling said cell to components of the invention contained within said housing, said leads being preferably introduced into the interior of said housing through means for sealing said housing to exclude contaminants.

In the preferred embodiment of the invention as shown in the drawing, there is provided a means for covering and uncovering aperture 26, said means comprising a single-bladed element, which in the preferred form includes an opening therein. Mounted in the housing, for example, on rear portion 22 is such a means, as for example, planar shutter blade 34, said shutter blade being movably mounted, for example, for pivotal movement about pivot 36 between a rest position and a set position. Blade 34 includes an opening 38 therein, which opening passes over aperture 26 during exposure movement of said blade, i.e., a portion of the pivotal movement of blade 34 from the set position wherein said opening lies to one side of aperture 26 to the rest position, wherein said opening lies to an opposite side of said aperture, thereby offering no obstruction to light passing through the aperture in the front housing portion to and through the exposure aperture 26. Blade 34 is shaped to completely occlude aperture 26 whenever blade opening 38 or any portion thereof does not overlie aperture 26. Blade 34 is provided with an arm portion 40 disposed on the opposite side of the pivotal axis of blade 34 from opening 38. Blade 34 also includes, adjacent the pivotal axis thereof, means such as finger 42 for coupling blade 34 with an actuating means for rotating said blade from rest position to set position. For simplicity and ease in manufacturing, blade 34, as recited, may be manufactured, for instance, by stamping as a unit from a flat sheet of metal.

The actuating means, in engagement with and for rotating blade 34, is preferably of the "self-cocking" type wherein a single movement of said actuating means both cocks, i.e., moves the blade to the set position, and disengages the blade at set position to allow the blade to return to its normal or rest position, the actuating means re-engaging the blade after the blade has so returned. In the preferred embodiment, the actuating means for rotating blade 34 comprises lever 50 pivotally mounted as at 52 to rear housing 22. A portion of lever 50 such as arm 54 may extend through an opening 56 provided in the side of housing 20 to provide means for enabling an operator to rotate lever 50 about pivot 52 in an arc defined by means, such as marginal portions 58 and 59 of opening 56, for limiting movement of lever 50. Suitable means for sealing opening 56 may be provided, as by an elastic sheet affixed to the periphery of said opening and snugly fitted about arm 54. Alternatively, the actuating means may comprise an arm attached to an axle extending through front housing portion 24 and fixed to blade 34, thereby eliminating opening 56. As a means for biasing lever 50 in a clockwise direction, there is provided a resilient means such as return spring 60 which is attached at one extremity to rear housing portion 22 as at 62, and at the other extremity of spring 60 to an anchoring means such as stud 64 disposed upon lever 50 between pivot 52 and opening 56. Lever 50 is provided with means such as arm extension 66 for cooperating with finger 42 and in slidable engagement therewith for rotating shutter blade 34 from rest position to set position, arm extension 66 being disposed opposite arm 54 with respect to the pivotal axis of rotation of lever 50.

As no exposure is intended to be made during movement of blade 34 from the rest position to the set position, in the preferred form of the invention auxiliary means are provided to cover aperture 26 during that portion of the movement of said blade from rest position to set position during which opening 38 in blade 34 passes over aperture 26. In the preferred embodiment, said auxiliary covering means comprises shutter blind member 70 which is attached to and so movable with lever 50 that movement of said lever for rotating blade 34 into said set position moves shutter blind member 70 into covering relation to aperture 26 during that portion of said movement when opening 38 overlies aperture 26. Member 70 includes a planar shutter blind portion 72 which is movable across aperture 26 in a plane parallel to and adjacent to the plane of movement of blade 34. As with the shutter blade 34, and in a similar manner, lever 50 and its associated portions including shutter blind member 70, for the sake of simplicity in manufacture, assembly and operation, may be manufactured, for instance, by stamping as a unit from a metal sheet. Extending approximately perpendicularly to the plane of movement of and being attached to lever 50 adjacent pivot 52 is a support means such as pin 74.

A means for controlling the speed of pivotal movement of blade 34 from set position to rest position and therefore, the exposure period, is provided preferably in the form of an elastic collapsible and expansible pneumatic element such as bellows 80. Said bellows in the form shown has a stationary extremity 82 which is attached to a side of housing 20, and has a movable extremity 84 axially movable to allow expansion and collapse of said bellows. Although movable extremity 84 may be pivotally attached to blade 34, in the form shown, it is connected by direct attachment as at 85, to arm portion 40 of blade 34. The direct connection of the blade to the speed control means confers several advantages to this invention over the prior art. It reduces linkages to a minimum, thereby minimizing the inertia of the system and virtually eliminating any problem of backlash or creep found in complex mechanical linkages. Further, it reduces frictional effects inherent in a complex linkage system, thereby providing for smoother and more positive operation. Extremity 84 is so disposed in the arcuate path of movement of arm 40 that clockwise rotation of blade 34 collapses bellows 80. After bellows 80 has been collapsed, expansion of said bellows by, for instance, atmospheric pressure, rotates arm portion 40 in a counterclockwise direction. Bellows 80 includes an aperture 86 therein located adjacent stationary extremity 82; otherwise said bellows is preferably pneumatically sealed. Bellows 80 is preferably provided in a cylindrical form having an elastic structural material such as rubber, but is in no sense limited to either this form or material. It should be noted that, as in FIGURE 1, a resilient means comprising spring 87 may be attached at one extremity to tension-adjusting plate-and-bolt assembly 88 which is attached to housing 20, the other extremity of spring 87 being connected to moving end 84 of bellows 80. Hence, the counterclockwise rotation of arm portion 40 may be under the combined bias of spring 87 and expanding bellows 80 or any combination of the two or the bellows alone. It is, however, preferable that the resiliency of spring 87 be substantially in excess of that of bellows 80 to provide for more accurate control of the movement of blade 34.

The expansible and collapsible pneumatic member of this invention, in the preferred embodiment, comprises elastic bellows 80 which exhibits several distinct advantages over other mechanical amplifying means for retarding shutter blade speeds. It is simple in construction, easy to operate and has a comparatively long, trouble-free operating life. In the use of such bellows, frictional factors are minimized, there being no piston to cylinder wall contact, for instance. A bellows is more easily sealed to exclude dirt and other contaminants; no lubricants are necessary as might well be required as with a piston and cylinder arrangement; a superior internal air-seal is easily obtained, there being no piston-skirt to cylinder-wall by-pass tolerances to consider; there being a minimum of moving parts, manufacturing problems are consequently simplified; the inertia and friction between moving parts may be kept to a minimum so that response and sensitivity are optimal, there being no need of linkages such as piston to piston rod; and the bellows may be, as shown, directly attached to a shutter blade, any distortion of the bellows, due to lack of a pivotal connection, having no serious effect on the operation of the mechanism. Furthermore, the bellows itself may provide the only means necessary, through its inherent resiliency, for moving the shutter blade from said set position to said rest position.

Means for controlling the rate of expansion or collapse of the pneumatic member comprises means for transmitting a fluid from and to said member, and means for controlling fluid flow through the last-named means and being coupled with and responsive to electrical signals from the photosensitive means. As a means for transmitting a fluid, pipe 90 is attached at one extremity thereof to aperture 86 in bellows 80, the juncture of said pipe and said bellows being pneumatically sealed. To provide for desirable fluid flow characteristics, pipe 90 preferably comprises a member having no interior surface discontinuities such as angled bends. Attached to the other extremity of pipe 90 is a means for controlling fluid flow through said pipe comprising an element such as block 92 (shown in FIG. 3) having a passageway 94 therein. Pipe 90 is attached and sealed to one end of passageway 94, the other end of said passageway being shaped to present a fluid aperture 96 at a surface of block 92. Aperture 96 preferably has a "bowtie" cross section configuration as shown in FIG. 4, the total area of said cross section being a function of a maximum fluid displacement of the interior of bellows 80. The minimum width of the aperture cross section configuration is preferably in the nature of .010 inch, the maximum width at each end of said cross section being preferably about 0.1 inch. Means for controlling fluid flow through pipe 90 also comprises valve means coupled to cell 28 for cooperating with fluid aperture 96 to produce an effective fluid orifice which is variable in area responsively to electrical signals from said cell. Said valve means may comprise, for instance, a fluid obstructing member displaceable by means such as a galvanometer element, a solenoid, or such other well known electrical apparatus as may translate electrical signals from cell 28 into mechanical displacements for varying fluid flow through aperture 96.

In FIG. 3, the valve means is shown as galvanometer element 100 which comprises the usual field magnet 102, rotatable field coil 104, spring 106, and a vane 108 so attached and rotatable with field coil 104 that the plane of movement of vane 108 is adjacent to and parallel with that portion of the surface of block 92 in which aperture 96 is formed, the clearance provided between block 92 and vane 108 being only sufficient to allow free rotation of said vane without binding. Vane 108 is shaped to provide an opening therein such as an arcuate slit 110, which varies continuously, for instance, from a maximum width of .2 inch to a minimum width of .010 inch, and having an arcuate length of approximately the rotational displacement of coil 104 for a predetermined range of light intensities. Vane 108 preferably comprises a thin resilient metal sheet material such as aluminum, beryllium-copper alloy or steel. As shown in FIG. 4, slit 110 and aperture 96 are so disposed relative to one another that an arcuate axis A—A lying midway between the sides of slit 110 intersects B—B of aperture 96 at the most constricted area of aperture 96 regardless of the rotational position of coil 104. As the most satisfactory fluid flow characteristics may be obtained with an orifice having a circular cross section, this disposition of slit 110 and aperture 96 provides a variable orifice which preferably approximates the optimal cross section configuration over a range of size variations. It should be noted that, in the disposition described, the orifice thus provided is defined on two sides by the configuration of aperture 96 and on two other sides by the configuration of slit 110. Coil 104 is mounted inside magnet 102 for pivotal movement and is provided with resilient means such as spring 106 for biasing said coil in a clockwise direction. At a predetermined minimal light intensity, the bias imposed on coil 104 by spring 106 will urge said coil to a position at which the effective orifice is at a maximum. For other light intensities incident on photosensitive means 28, coil 104 will assume a corresponding position of equilibrium determined by the opposition of the bias of spring 106 against the magnetic moment imposed by an interaction of the field magnet 102 and coil 104 through which the output of photosensitive means 28 is led. Means for limiting the total excursion of vane 108 is provided as by stop pins 112 and 114, thus providing positions of vane 108 at which the effective orifice has maximal and minimal cross sectional areas. While the preferred form of this invention includes pipe 90 and block 92, opening 86 in stationary extremity 82 of bellows 80 may be shaped to provide the preferred "bowtie" aperture configuration, and galvanometer 100 and vane 108 may be mounted then with respect to opening 86 to obtain the desired means for controlling the rate of expansion of bellows 80.

Inasmuch as vane 108 is easily rotated and it is possible to disturb the position thereof relative to fluid aperture 96 by vibrations or other physical forces, it is desirable in the preferred form of the invention to provide means for holding said vane stationary during exposure movement of blade 34. As shown in FIGURE 1, there is provided such a means which may take the form, for instance, of flat resilient clamping member 120 (shown only in fragment) said member being attached to housing portion 22 and extending therefrom toward vane 108. Member 120 is biased by its own resiliency for frictional engagement with vane 108 to clamp said vane between extremity 122 of member 120 and block 92. As shown, however, member 120 is so slidably and releasably supported by pin 74 that extremity 122 is suspended for a distance above vane 108 just sufficiently to allow said vane to rotate freely thereunder. Extremity 122 preferably includes an opening 124 therein, said opening being so disposed as to overlie fluid aperture 96 and being so dimensioned as to have a minimal cross sectional area in excess of the area of the maximum orifice presented by the combination of vane slit 110 and fluid aperture 96.

The shutter mechanism herein disclosed may be used in combination with any of the conventional diaphragms well known in the art, either the manually adjustable variety or the photoresponsive type. It is, however, preferable to use a diaphragm having a fixed aperture in order to dispense with exposure control adjustment functions by an operator.

In operation, from a rest position of lever arm 50 wherein said lever arm is positioned adjacent marginal portion 59 of opening 56 in housing 20, force applied by an operator rotates arm 50 in a counterclockwise direction against the bias of return spring 60. The rotary movement of arm 50 about pivot 52 is slidably transmitted to finger 42 by arm extension 66 to rotate shutter blade 34 in a clockwise direction about pivot 36 from a position of rest to a set position. As arm 50 is thus rotated counterclockwise and blade 34 rotates accordingly clockwise, opening 38 in blade 34 is brought into an uncovering position wherein said opening overlies and exposes aperture 26. The rotation of arm 50 is accompanied by an equal rotation of attached shutter blind 70 which is so disposed angularly relative to shutter blade 34 that when the opening in said blade reaches said uncovering position, shutter blind 70 has been moved into a covering relation to exposure aperture 26 excluding light therefrom. As the force rotating arm 50 counterclockwise continues, blade 34 arrives at a set position at which the arcuate path of arm extension 66 no longer intersects the arcuate path of finger 42, and arm extension 66 disengages from said finger allowing said finger and blade 34 to rotate freely counterclockwise under the bias of bellows 80 and spring 87. It should be noted that under certain circumstances it would be desirable to prevent premature re-engagement of finger 42 and arm extension 66. Suitable latch means for temporarily restraining arm extension 66 in a disengaged position may then be provided.

On or at a predetermined interval before the disengagement of arm extension 66 from finger 42, pin 74 which is so disposed normally to support resilient clamping member 120 and which rotates with arm 50, arrives at a position at which member 120 is no longer supported and said member is free to move under its own resiliency. The resilient movement of unsupported member 120 results in said member engaging vane 108 to retain said vane in a fixed position during movement of shutter blade 34 from a set position to a rest position. Alternatively, as a means for clamping vane 108 during exposure movement of blade 34, member 120 may be so disposed relative to said vane as to provide adequate clearance for movement of said vane when member 120 is in an unsupported position. Pin 74 may then be disposed to provide means for forcing member 120 against vane 108 when finger 42 and arm extension 66 disengage. The latter embodiment would have the advantage of providing a clamping mechanism which need be only resilient enough to return to a rest position.

Photovoltaic cell 28 translates light incident thereon into electrical signals proportional to light intensities and said signals are introduced into field coil of element 100 causing coil 104 to rotate about its pivotal axis to an equilibrium position to determine the effective orifice provided by the combination of slit 110 and fluid aperture 96. As the rate of fluid flow through said orifice determines the speed of movement of blade 34, the light incident on cell 28 establishes blade speeds.

It is preferable to employ the rate of expansion of bellows 80, as the independent variable for controlling shutter speed, although the rate of contraction also could be used as the controlling parameter. The expasnion of bellows 80 causes fluid such as air to be drawn into said bellows through said orifice; the pressure differential caused by the inward movement of air will force vane 108 against block 92, thus creating an air seal and minimizing leakage between said vane and said block. Also, inward air flow through said orifice is less turbulent than an outward flow and hence provides a smoother and more accurate mechanism.

Numerous other modifications of this invention will be apparent to those skilled in the art in view of the teachings herein.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. In a photographic device, a photoresponsive shutter mechanism comprising, in combination, means for defining an exposure aperture, photosensitive means for producing electrical signals in accordance with light incident thereon, shutter means mounted for movement across said aperture for covering and uncovering the latter to effect exposure therethrough, means for moving said shutter means, and an elastic-walled pneumatic means for controlling the speed of movement of said shutter means responsively to said electrical signals, said pneumatic means being attached to said shutter means.

2. In a photographic device, a shutter mechanism as in claim 1 wherein said pneumatic means comprises a bellows.

3. In a photographic device, a photo-responsive shutter mechanism comprising, in combination, means for defining an exposure aperture, photosensitive means for producing electrical signals in accordance with light incident thereon, a single movable shutter blade for controlling exposure time through said aperture, an elastic walled, collapsible and expansible pneumatic means for controlling the speed of movement of said blade, the speed of said movement being a function of the time rate of expansion of said pneumatic means in response to said electrical signals.

4. A shutter for a photographic device as in claim 3 wherein said pneumatic means comprises a bellows having an opening in a portion thereof, and including a means for varying gas flow through said opening in said bellows responsively to said electrical signals.

5. In a photographic device, a photo-responsive shutter mechanism, comprising, in combination, means for defining an exposure aperture, photosensitive means for producing electrical signals in accordance with light incident thereon, a movable shutter element for covering and uncovering said aperture, means for mounting said element for uncovering movement of said element relative to said aperture, means for moving said element, and an elastic walled pneumatic means for controlling the speed of movement of said element responsively to said electrical signals, said shutter mechanism being hermetically sealed.

6. In a photographic device, a photo-responsive shutter mechanism comprising, in combination, means for defining an exposure aperture, photosensitive means for producing electrical signals in accordance with light incident thereon, a movable shutter element for covering and uncovering said aperture, means for mounting said element for uncovering movement of said element relative to said aperture, means for moving said element, an elastic walled pneumatic means cooperating with said element for controlling the speed of movement thereof responsively to said electrical signals, means for enclosing said shutter mechanism for excluding contaminants, and means for venting said means for enclosing to allow movement of only air therethrough.

7. In a photographic device, a photo-responsive shutter mechanism comprising, in combination, a housing means having an exposure aperture therein, a photosensitive means for producing electrical signals in accordance with light incident thereon, a movable shutter element having an opening therein and being mounted on said housing for movement of said opening across said aperture, actuating means engageable with and for so moving said element that said opening moves across said aperture in a first direction, means cooperating with said actuating means for covering said aperture during movement of said opening in said first direction, means for so moving said element in an opposite direction that said opening moves across said aperture thereby producing an exposure, and an elastic pneumatic means for controlling the speed of movement of said element in said opposite direction in response to said electrical signals, said pneumatic means being electrically coupled with said photosensitive means and being directly connected to said shutter element.

8. In a photographic device, a photo-responsive shutter mechanism comprising, in combination, a housing means having an exposure aperture therein, a photosensitive means for producing electrical signals in accordance with light incident thereon, a movable shutter blade for completely covering said aperture, said blade having an opening therein, means for mounting said blade for movement of said opening across said aperture to produce an exposure, the time interval of said exposure being a function of the speed of said movement, means for moving said blade, an elastic, collapsible and expansible pneumatic member for controlling the speed of said movement responsively to said signals, said pneumatic member being electrically coupled with said photosensitive means and being directly and rigidly connected to said blade.

9. In a photographic device, a photo-responsive shutter mechanism comprising, in combination, a housing means having an exposure aperture therein, a photosensitive means for producing electrical signals in accordance with light incident thereon, a rotatable shutter blade for covering and uncovering said aperture, said blade having a finger portion and an arm portion, means for mounting said blade for uncovering movement of said blade relative to said aperture, an elastic, expansible and collapsible bellows for controlling the speed of movement of said blade, one extremity of said bellows being attached to said housing means, the other extremity of said bellows being attached to said arm portion of said blade and movable therewith, actuating means in slidable and releasable engagement with said finger of said blade for rotating said blade and for collapsing said bellows to an energized position, said bellows being elastically expansible from said energized position for imparting said uncovering movement to said blade, valve means for controlling the rate of elastic expansion of said bellows, said valve means being coupled with said photosensitive means and being responsive to said electrical signals.

10. In a photographic device, a photo-responsive shutter mechanism comprising, in combination, a housing means having an exposure aperture therein, a photosensitive means for producing electrical signals in accordance with light incident thereon, a rotatable shutter blade for covering and uncovering said aperture, means for mounting said blade for movement thereof across said aperture to produce an exposure, means for moving said blade, and means for controlling the speed of said movement, the last-named means comprising an elastic, collapsible and expansible bellows having one extremity attached to said housing, the other extremity of said bellows being attached to a portion of said blade and being movable therewith, said bellows having an opening therein adjacent said fixed extremity, a galvanometer-controlled valve means, means for transmitting a gas from said opening to said valve means, said valve means being coupled with said photosensitive means and being responsive to said electrical signals for varying the flow of said gas through said valve means proportionately to said light intensity.

11. In a photographic device, a photo-responsive shutter mechanism comprising, in combination, means for defining an exposure aperture, photosensitive means for producing electrical signals in accordance with light intensities incident thereon, movable shutter means for covering and uncovering said aperture to establish an exposure time interval therethrough, an elastic, collapsible and expansible pneumatic bellows for controlling aperture-uncovering movement of said shutter means, the speed of said aperture-uncovering movement of said shutter means being a function of the time rate of expansion of said bellows, valve means for controlling gas flow into said bellows to vary said time rate of expansion, said valve means comprising a galvanometer element electrically coupled with said photosensitive means, a valve blade attached to said galvanometer and rotatable along a path, the length of said path being determined by said electrical signals, said valve blade having an arcuate slot therein, said slot varying continuously in width, a valve block, means providing a passageway from said valve block to said bellows, said block having a valve aperture therein, said valve aperture having a bow tie configuration in cross section, said valve aperture and said slot cooperating for determining an effective valve orifice, said orifice being variable in dimensions in accordance with said electrical signals.

12. In a photographic camera, an automatic shutter speed control mechanism for varying shutter speeds responsively to electrical signals received from a photosensitive device, said shutter being of the single bladed type, said mechanism comprising an elastic, expansible and collapsible pneumatic member attached directly to said blade, valve means for so varying gas flow into said member that the time rate of expansion of said member is controlled thereby, said valve means being electrically coupled with said photosensitive device for varying said flow proportionately to said electrical signals.

13. In a photographic camera, an automatic shutter speed control mechanism for varying shutter speeds responsively to electrical signals received from a photosensitive device, said shutter being characterized by having a single blade, said mechanism comprising an elastic, expansible and collapsible bellows, one extremity of said bellows being retained in a fixed position, the opposite extremity of said bellows being attached directly to said blade, said bellows having an opening adjacent said fixed extremity, valve means, means for transmitting gas, one extremity of the last-named means being attached to said opening, the other extremity of said last-named being attached to said valve means, said valve means comprising means defining an aperture, a valve gate, means for coupling said valve means with said photosensitive means, means for translating said electrical signals into mechanical displacements of the position of said valve gate relative to said aperture, said position of said valve gate relative to said aperture establishing gas flow through said aperture responsively to said electrical signals.

References Cited in the file of this patent

UNITED STATES PATENTS

| | | |
|---|---|---|
| 2,187,953 | Schmidt | Jan. 23, 1940 |
| 2,238,491 | Hutchison | Apr. 15, 1951 |
| 2,800,844 | Durst | July 30, 1957 |
| 2,885,938 | Durst | May 12, 1959 |

FOREIGN PATENTS

| | | |
|---|---|---|
| 489,348 | Italy | Jan. 19, 1954 |